(12) United States Patent
Kindler et al.

(10) Patent No.: US 8,904,494 B2
(45) Date of Patent: Dec. 2, 2014

(54) SYSTEM AND METHOD TO FACILITATE COMPLIANCE WITH COPPA FOR WEBSITE REGISTRATION

(71) Applicant: Cleanport, BV, BM Doetinchem (NL)

(72) Inventors: Noah Kindler, Atherton, CA (US);
Gregory Dean, San Francisco, CA (US);
Saman Sedighian, San Jose, CA (US);
Valeri Savvateev, Palo Alto, CA (US);
Michael Bennett, San Diego, CA (US)

(73) Assignee: Avira B.V., BM Doetinchem (NL)

( * ) Notice: Subject to any disclaimer, the term of this patent is extended or adjusted under 35 U.S.C. 154(b) by 170 days.

(21) Appl. No.: 13/712,793

(22) Filed: Dec. 12, 2012

(65) Prior Publication Data

US 2013/0152171 A1     Jun. 13, 2013

Related U.S. Application Data

(60) Provisional application No. 61/569,661, filed on Dec. 12, 2011.

(51) Int. Cl.
*G06F 7/04*      (2006.01)
*G06F 15/16*     (2006.01)
*G06F 17/30*     (2006.01)
*H04L 29/06*     (2006.01)
*G06F 21/00*     (2013.01)

(52) U.S. Cl.
CPC .............. *H04L 63/08* (2013.01); *H04L 63/084* (2013.01); *G06F 21/00* (2013.01); *H04L 63/10* (2013.01)
USPC .................................................. 726/4; 726/2

(58) Field of Classification Search
USPC ........................................................... 726/4
See application file for complete search history.

(56) References Cited

U.S. PATENT DOCUMENTS

2011/0035799 A1* 2/2011 Handler ........................ 726/21
2011/0072039 A1* 3/2011 Tayloe ......................... 707/769
2012/0047560 A1* 2/2012 Underwood et al. ............. 726/4

* cited by examiner

*Primary Examiner* — Andrew Nalven
*Assistant Examiner* — Khang Do
(74) *Attorney, Agent, or Firm* — Cooley LLP

(57) ABSTRACT

Embodiments of the present invention provide a third-party system that allows parents or authorized guardians to continually grant permissions to several websites and online services and provides a one-time-authentication process of the parent-child relationship. Through this system, the need to re-authenticate the parent-child relationship or for each online company to build their own authentication system and COPPA record keeping mechanisms can be reduced or eliminated. In addition, the embodiments provided herein may afford a service for managing COPPA compliance that is relatively easy for online companies to integrate into their online services and websites.

20 Claims, 12 Drawing Sheets

FIG. 9

SYSTEM AND METHOD TO FACILITATE COMPLIANCE WITH COPPA FOR WEBSITE REGISTRATION

CROSS REFERENCE TO RELATED APPLICATIONS

This application claims the benefit of U.S. Provisional Application No. 61/569,661, filed Dec. 12, 2011, which is hereby incorporated by reference herein in its entirety.

TECHNICAL FIELD

Embodiments of the present invention generally relate to notice and authorization systems and, in particular, notice and authorization systems for network based services.

BACKGROUND

One of the hardest problems for online companies is verifying the age of their users. In the past, there really has been no good technological way to determine the age of a user accessing an online company's website or online services.

This problem has become particularly acute with the passage of the Children's Online Privacy Protection Action (COPPA) (15 U.S.C. §§6501-6506) which prohibits online companies from storing information about users under the age of thirteen without their parent's or legal guardian's permission. In order to comply with COPPA, many online companies query each of their users for their date of birth and, if the response indicates that the user is under thirteen, then prohibiting that user from accessing or using the company's website or online service.

Such authentication procedures can create problems. For example, circumventing or spoofing these kinds of systems is rather trivial. All a user has to do is enter a false date of birth that indicates that the user is older than thirteen in order to access the website. Another common problem is that most online companies do not have a mechanism to allow for storing of information about a under-thirteen child if the child's parent grants (or wants to grant) them permission to store information about the child and still being in compliance with COPPA.

SUMMARY

Embodiments of the present invention provide a third-party system that allows parents or authorized guardians to continually grant permissions to several websites and online services and provides a one-time-authentication process of the parent-child relationship. Through this system, the need to re-authenticate the parent-child relationship or for each online company to build their own authentication system and COPPA record keeping mechanisms can be reduced or eliminated. In addition, the embodiments provided herein may afford a service for managing COPPA compliance that is relatively easy for online companies to integrate into their online services and websites.

In accordance with the various embodiments described herein, a system, method and computer program product are disclosed for facilitating compliance with COPPA for website registration. In one embodiment, a service receives a request sent from a site coupled to a network requesting that service to authorize a user seeking access or register with the site. The service is located remotely from the site and the user. The service determines whether the user has previously registered with the service and if the user is determined to have been previously registered, the service identifies an authorizing agent that is associated with the user from a database coupled to the service. In one embodiment, the user is a child less than thirteen years old and the authorizing agent is a parent or legal guardian of the child. The service then sends a message to the identified authorized agent requesting authorization for the user to access the site.

If on the other hand, the service determines that user has not registered with the service before, the service obtains the name and email address of the user and checks to see whether any parents or other authorizing agents previously registered with the service have identified the user as one of their children. If so, the service then displays the user a list of the parents that are potentially associated with the user so that the user can select one of the parents from the list. If the user selects one of the parents on the list, the service sends a message such as an email message requesting that the parent authorize the child's to access the site.

If the child does not select any parents from the list (indicating that none of the parents are associated with the child user), then the service queries the child for his or her name, an email address of an person that is authorized to authorize the user's access the site, and for an answer to a security question. Next, the identified authorized person is queried by the service to confirm that the child is in fact associated with the parent and to provide an answer to the security question. The parent/authorizing agent is also asked to provide information about a credit card to help confirm the identity of the patent.

After receiving the answer to the security question from the parent, the service compares the answer with the answer provided by the child user and uses the credit card information to determine whether the person answering the question knows enough about the child and has an address that matches the parent's address in order to be considered the parent/authorized guardian. Once the parent has been identified as an authorizing agent, the parent is queried to provide a message that indicates whether the parent has authorized or denied the child's request to register with and/or access the site. The service also stores a record in the database that indicates whether the parent authorized the child user to access the site and links the parent to the child user. Next, the service then notifies the site so that the site can finishing registering the child user with the site.

In one embodiment, the security question is selected by the child user from a set of two or more predetermined security questions randomly retrieved from a larger set of security questions stored in the database. In another embodiment, each security question has an unique identifier associated with it so that the question can be identified simply from its unique identifier. In yet a further embodiment, the user may also be assigned a unique identifier to the user so that a one-way hash may be generated from the unique identifier of the user, the unique identifier of the security question and the answer provided by the user. This one-way hash may subsequently compared to another one-way hash generated from the unique identifier of the user, the unique identifier of the security question, and the answer provided by the parent. If the two one-way hashes match, it indicates to the service that the answer provided by the parent is the same answer originally provided by the child user. As a result of this determination, therefore, the parent-child relationship between the queried parent and the requesting child user can be confirmed.

DESCRIPTION OF THE FIGURES

FIG. 9 is an exemplary parent information webpage that may be displayed to a parent by the compliance service in which the parent can input his or her personal information and credit card information in accordance with one embodiment.

DETAILED DESCRIPTION

Figure 1:
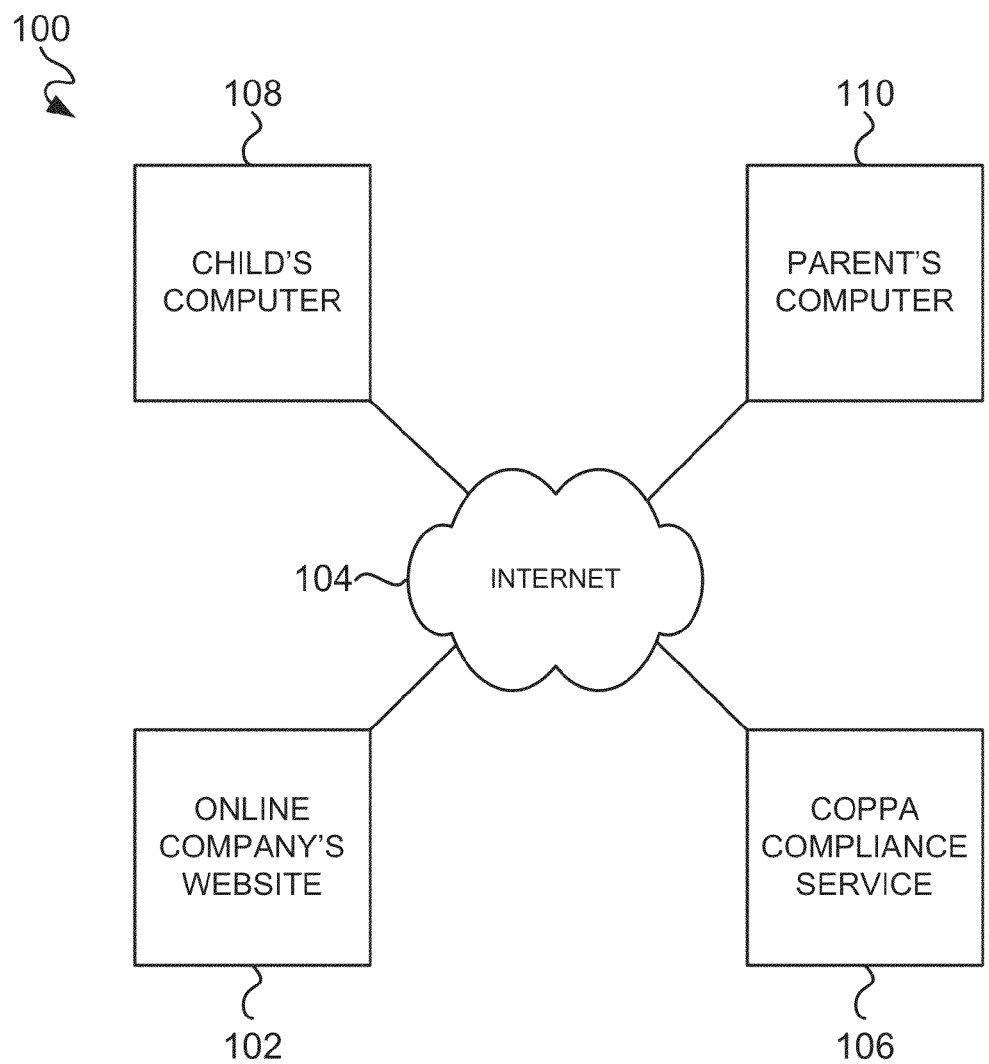
FIG. 1 is a schematic block diagram of an exemplary system for implementing various embodiments of the third-party authentication system.

FIG. 1 is a schematic block diagram of an exemplary system for implementing various embodiments of the third-party authentication system 100. As shown in FIG. 1, one or more online companies' websites or online services 102 (i.e., "third-party sites" or "online service providers") may be coupled to the Internet 104 (or other wide-area network) in order to afford access to the website(s) via the Internet 104. Also coupled to the network 104 are a COPPA compliance service 106 (or "authentication service provider") and one or more computers 108 used by children (i.e., child users' computers) and one or more computers 110 used by parents or authorized/legal guardians of the children (i.e., parent users' computers). Thus, via the Internet 104, the online companies 102, COPPA compliance service 106, child users 108 and parent users 110 may communicate with one another in manners well-known one of ordinary skill in the art and consistent with the various embodiments of the system 100 described herein.

Figure 2:
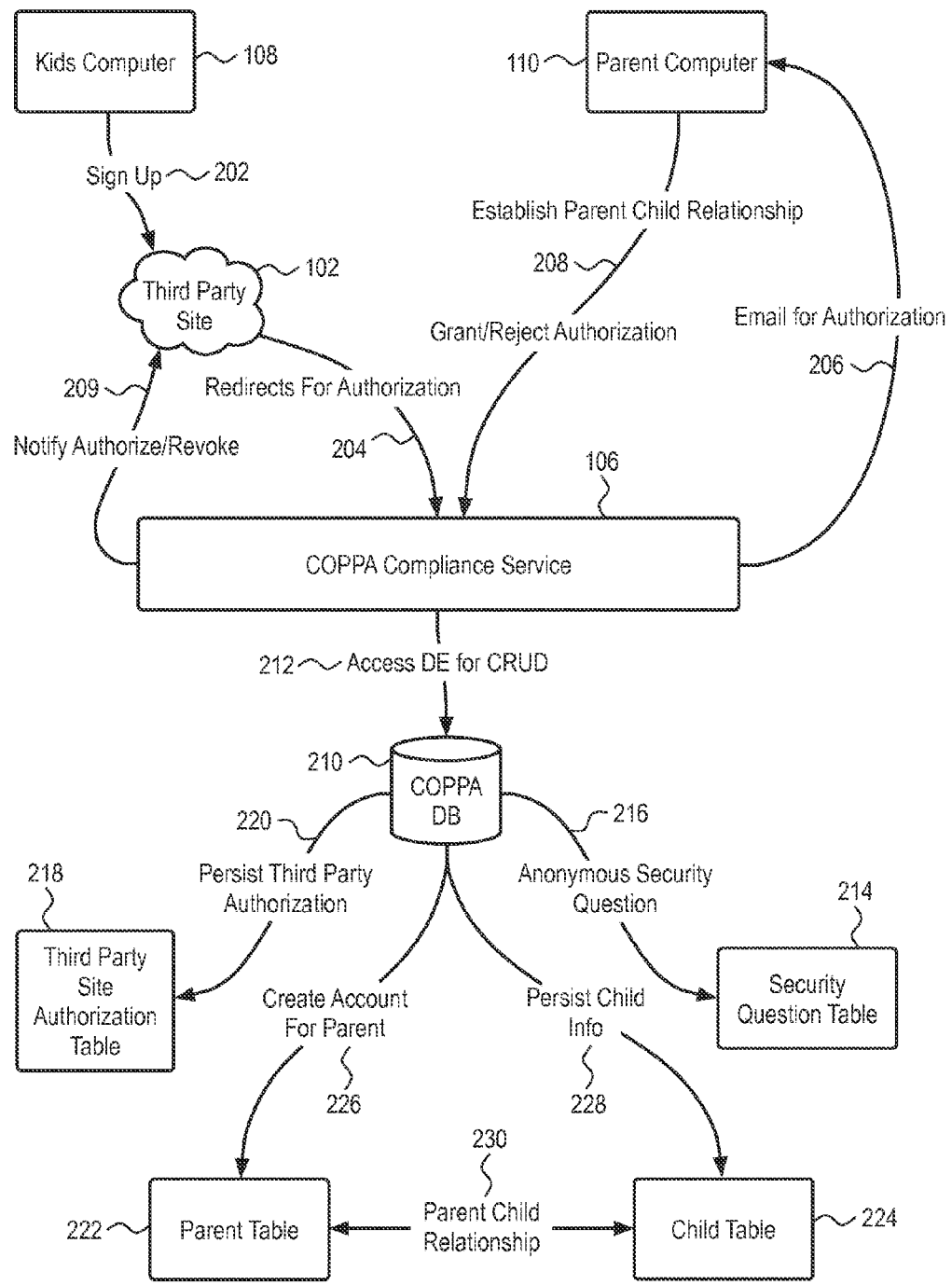
FIG. 2 is a schematic representation of an exemplary authentication system in which a third-party authentication service may be used to provide authorization to a website during a child's sign-up process with the website.

FIG. 2 is a schematic representation of an exemplary authentication system 100 in which a third-party authentication service 106 may be used to provide authorization to a website 102 during a child's 108 sign-up process with the website 102. The system 100 provides a way for parents 110 to authenticate the parent-child relationship in a manner that is compliant with COPPA via the compliance system 106.

As shown in FIG. 2, one starting point for using the compliance system 100 may begin when a child uses his or her computer 108 to sign up or register with an online service or website 102 via the Internet 104 (path 202). As some point during the registration process with the online service 102, the online service 102 may redirect the child user 108 to the compliance service 106 (path 204) in order to obtain authorization for the child to complete the registration process. As shown in FIG. 2, the compliance service 106 may contact the child's parent or legal guardian by sending a notification (such as, e.g., an email message) to the parent's computer 110 (path 206) indicating that the parent's authorization is needed in order to complete the child's registration with the online service 102. The parent 110 may then communicate with the compliance service 106 so that the compliance service can establish and confirm the parent-child relationship between the responder 110 and the child 106 and obtain the parent's permission (or denial) (path 208) in order to allow the child to complete the sign up process with the online service 102. After receiving the parent's grant or denial of authorization for the child to sign up with the website 102, the compliance service 106 may send a notification (path 209) to the online service 102 that indicate whether the authorization has been granted or denied. In one embodiment, path 208 between the parent computer 110 and the compliance service 106 may also be used by the parent 110 to send from the a revocation of a previously-granted authorization to a website 102 in order to revoke a child's user's access to that website. In such embodiments, the notification (path 209) sent from the compliance service 106 to the online service 102 may comprise a notice indicating that the parent or guardian has revoked the child user's access to that website/service.

The COPPA compliance service 106 may include (or be coupled to) a database 210. The compliance service 106 generally accesses the database in order to create, retrieve, update, and delete ("CRUD") information stored in the database (path 212) and may be accessed to store and retrieve data obtained and/or used during the authorization process. The database 210 may include a number of tables or conception portions associated with various aspects of the authorization process. For example, the database 210 may include a security question table 214 that it may access (path 216) to select security questions to present to a child user and/or a parent during authorization process. The database may also include an online company authorization table 218 in which the compliance service can maintain and access (path 220) to track which children are authorized to access and use which online services and websites. The online company authorization table 218 may maintain, for example, various information about online companies using the compliance service such as, for example, whether an online site or service is a safe or trusted site, as well as identify which children are authorized users of the site. This table 218 may even contain information identifying the parents of the authorized children. The database 210 may also include parent and child tables 222, 224 which it may access (paths 226, 228) in order to store, retrieve and update information about registered parents and children as well as information about the parent-child relationship(s) between the parents and children (e.g., path 230) having entries in the database. It should be understood to one of ordinary skill in the art that all or a portion of the tables 214, 218, 222, 224 in the database 210 may be combined into a common table or distributed across multiple tables in manners well known and understood in the art.

Figure 3:
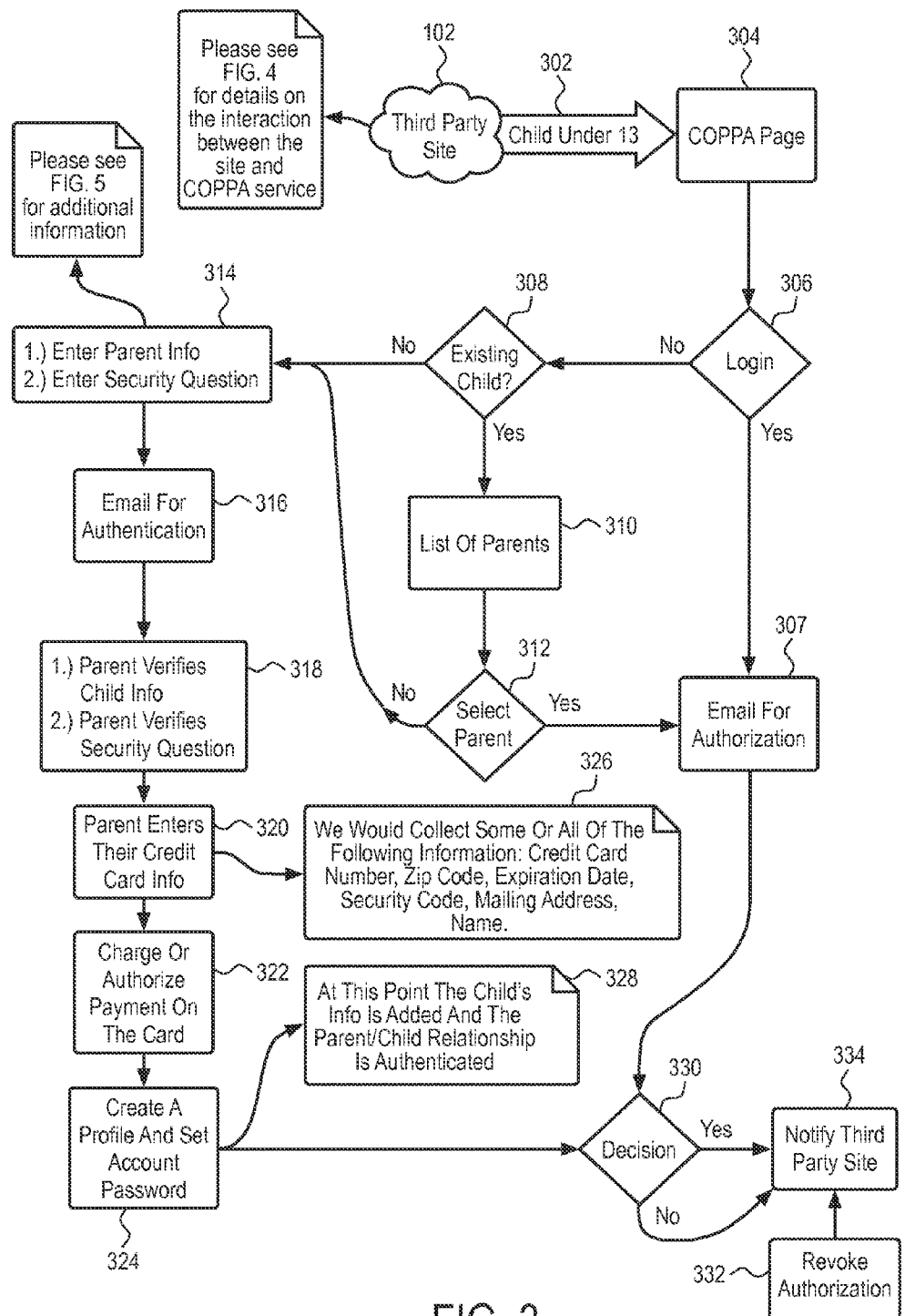
FIG. 3 is a process flow diagram for authorizing a child user to access an online service or website using a COPPA compliance service in accordance with one embodiment.

FIG. 3 is a process flow diagram for authorizing a child user to access an online service or website using a COPPA compliance service 106. Via this process, third party online companies may obtain parental authority to allow a child to access and use their online services and websites and allows the online companies to store information about the child in a manner that is compliance with COPPA rules and guidelines.

Figure 6:
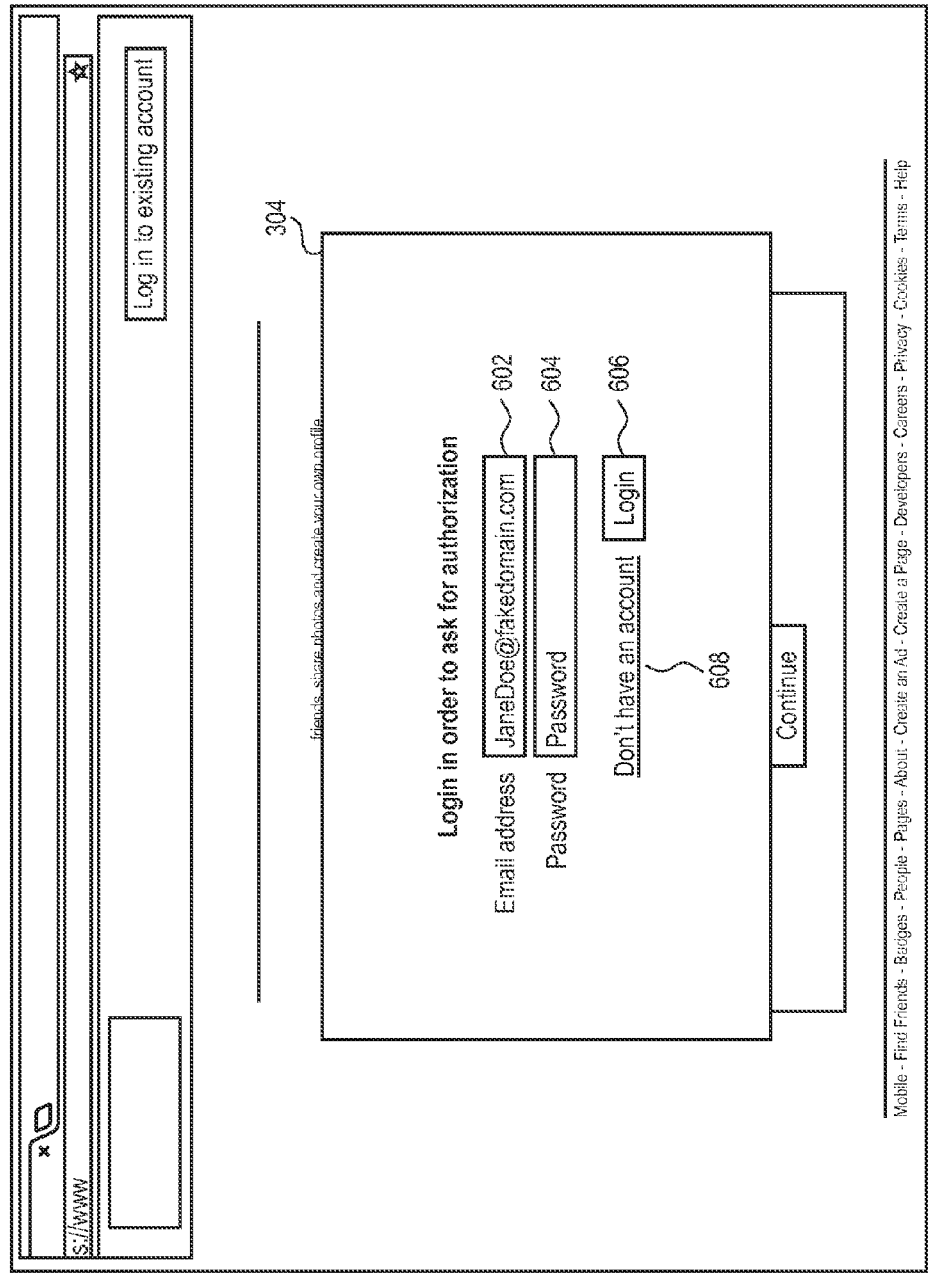
FIG. 6 is an illustrative login webpage that may be implemented in accordance with an embodiment of the COPPA compliance service.

The process may begin when a child 108 accesses an online service or website 102 and attempts to sign-up or register with the service. At some point, preferably early on in the registration process, the online service determines whether the user is a child under the age of thirteen. For example, the website 102 may display some sort of query to the user 108 asking for the user's date of birth or to confirm whether the user is thirteen years old or older. If the response to this query indicates that the user 108 is under the age of thirteen, then the online service may redirect the user 108 (path 302) to a webpage 304 associated with the COPPA compliance service 106. This webpage 304 may include login functionally (see decision 306) to allow a child user that has already been registered with the COPPA compliance service (such as, e.g., the child has previously used the service to obtain authorization to access another online service or website) to sign-in to the authorization process afforded by the compliance service 106. As illustrated in FIG. 6, the login webpage 304 may be some sort of pop-up style window superimposed over the registration page of online service. The webpage 304 may include queries for the child to input his or her email address 602 and a password 604 associated with the email address in order to login (via login button 606) to the service 106. The compliance service 106 may then compare the email address and password provided by the child with the information stored in the COPPA database 210 to determine whether the child has previously registered with the compliance service 106 (i.e., an child that has already been registered with the compliance service 106). In one embodiment, information about children already registered with the compliance service 106 may be stored in the child table 224 of the COPPA database.

If the compliance service 106 determines that the login information of the child user 108 matches the login information for one of the previously-registered children stored in the COPPA database 210, then the compliance service 106 may retrieve from the COPPA database 210 an email address for one or more authorized parents/guardians of that child and in operation 307 send an authorization email to the parent/guardian 110 notifying the parent that the child 108 wants access to the particular website/online service 102 and thereby seeks the parent's authorization to access the requested website/online service.

If the child has not previously registered with the compliance service 106 and, therefore, does not have an email address and password associated with the compliance service, the login page 304 may include a link 608 to allow the child to sign-up with the compliance service (the NO path from decision 306). In one embodiment, the compliance service 106 may then display an initial sign-up page (at decision 308) to the child user that queries the user to provide his or her first and last names and date of birth, and—optionally—his or her email address.

In accordance with one embodiment, upon receiving this initial information from the child user, the compliance system 106 checks the parent records stored in the database 210 to determine whether the information received from the child user matches a child already registered to one or more parents in the COPPA database 210. In one embodiment, the parent records may be stored in the parent table 222 of the database 210. Each parent record may contain one or more child instances associated with the parent. If the information provided by the child user matches one or more of the child instances in the parent records, then the compliance service displays to the child user a list of the parent name(s) of the one or more parent records that contain the matching child instance in operation 310 (via YES path from decision 308) and the child is queried to select one of the displayed parent names (and thereby the parent associated with the corresponding parent record) in decision 312.

Figure 7:
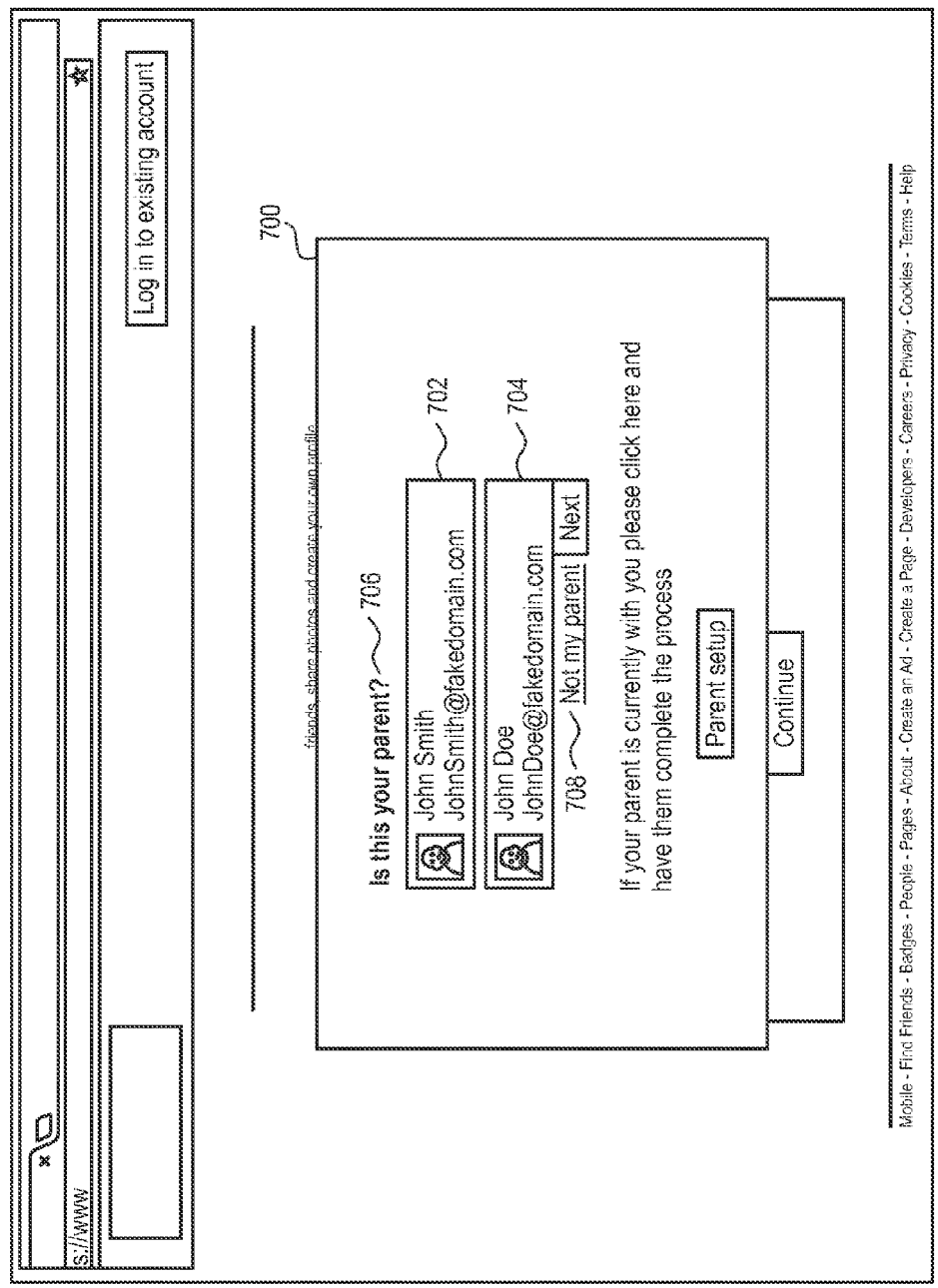
FIG. 7 is an exemplary parent list page generated by the compliance service that may be user to display a list of parent names to the child user in accordance with one embodiment.

FIG. 7 is an exemplary parent list page 700 generated by the compliance service 106 that may be user to display the list of parent names to the child user in operation 310. As shown in FIG. 7, the parent list page 700 may display the names of the one or more parents having matching child instances as selectable links (702, 704) and display a question that asks whether any of the displayed names is the parent of the child user (e.g., "Is this your parent?" 706). The page 700 may also include a selectable link to provide the child user an option to indicate that none of the displayed parent names is actually a parent or guardian to the child user (i.e., selectable link "No my parent" 708).

Returning to FIG. 6, if the child makes a selection form the selects one of the parent names on the displayed list of parents (e.g., the child user selects either selectable link 702, 704), then the YES path is followed from decision 312 to operation 307. In operation 307, the compliance service generates and sends an authorization email to the parent/guardian 110 notifying the parent that the child 108 wants access to the particular website/online service 102 and thereby seeks the parent's authorization to access the requested website/online service.

On the other hand, if the child user makes a selection that indicates that none of the displayed parent names corresponds to a parent or guardian of the child (e.g., the child user selects link 708), then the NO path is followed from decision 312.

If the information received from the child user does not match any child instances in the parent records (i.e., the NO path from decision 308) or the child user indicates that none of the parent names displayed in the list of parents is one of the child's parents or guardians (i.e., the NO path from decision 312)—in other words, if the parent list is empty or the child does not select any of the displayed parent names, then in operation 314, the compliance service 106 queries the child user for information about his or her parent or guardian ("parent information") and asked to select a security question and provide an answer to that question. The parent information asked from the child user may include, for example, the parent or guardian's first and last names, the email address of the parent/guardian, and/or a phone number of the parent/guardian. The security question selected by the child user and the child's provided answer are subsequently used by the compliance system to validate the identified parent (i.e., to verify the parent-child relationship between the child user and the parent/guardian identified by the child user).

In operation 316, the compliance service 106 uses the email address of the parent/guardian provided by the child user in operation 314 to generate and send an call-to-action authorization email to the parent/guardian associated with the provided email address. The call-to-action email sent to the parent/guardian 110 in operation 314 may include a message that identifies the requesting child user 108 and the website/online service 102 that the child seeks authorization to access. The email may also include one or more selectable links (e.g., an authorize button or HTTP hyperlink) that, upon its selection by the recipient parent/guardian 110, displays a webpage 800 from the compliance service 106 to query the parent in order to establish the parent-child relationship between the parent 110 and the child user 108 in operation 318.

Figure 8:
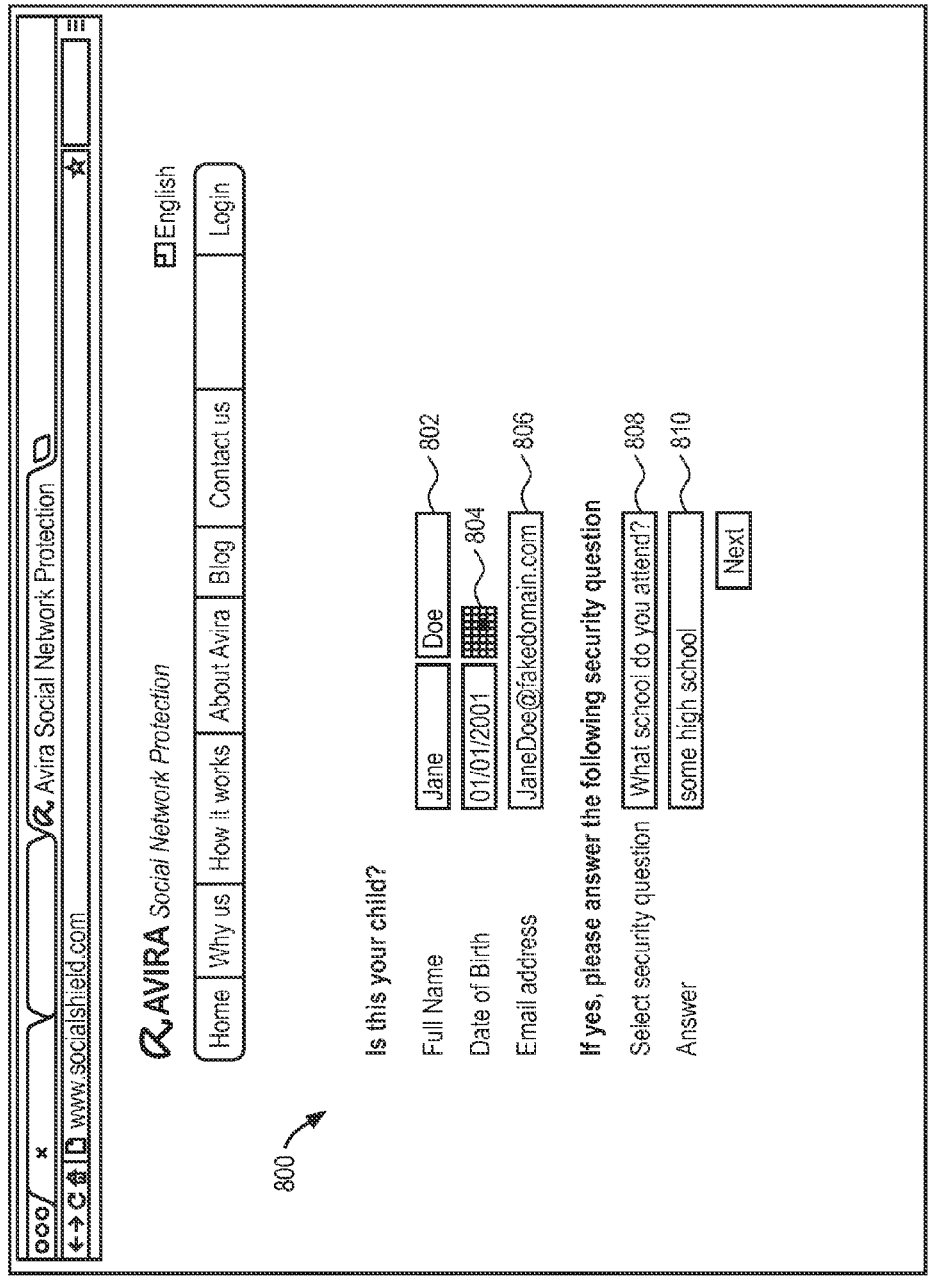
FIG. 8 is an exemplary query webpage that may be displayed to a parent by the compliance service in response to the parent selecting a selectable link in an email sent to question the parent and establish the parent-child relationship with a child user in accordance with one embodiment.

In response to selecting the parent 110 selecting the selectable link in the email sent in operation 316, the compliance service generates and displays a webpage to the parent 110 that may include information identifying the child user 108 and the security question selected by the child user in operation 314. FIG. 8 is an exemplary query webpage 800 that may be displayed to the parent 110 in operation 318 by the compliance service in response to the parent 110 selecting the selectable link in the email sent in operation 316 in order to question the parent 110 and establish the parent-child relationship between the parent 110 and the child user 108. As shown in FIG. 8, the page 800 may display information identifying the child user 108 such as the child's name 802 (preferably first and last names), birthday 804, and email address 806 that were obtained by the compliance service 106, for example, from the initial sign-up page that was displayed to the child user 108 at decision 308. The page 800 may also display the security question 810 selected by the child user 108 in operation 314 along with a some sort of input field 812 in which the queried parent 110 may input an answer to the displayed security question. The page 800 may also include a command 812 that sends the information input by the parent 110 on page 800 (e.g., the answer to the security question) to the compliance service 106 via the network 104.

Figure 9:
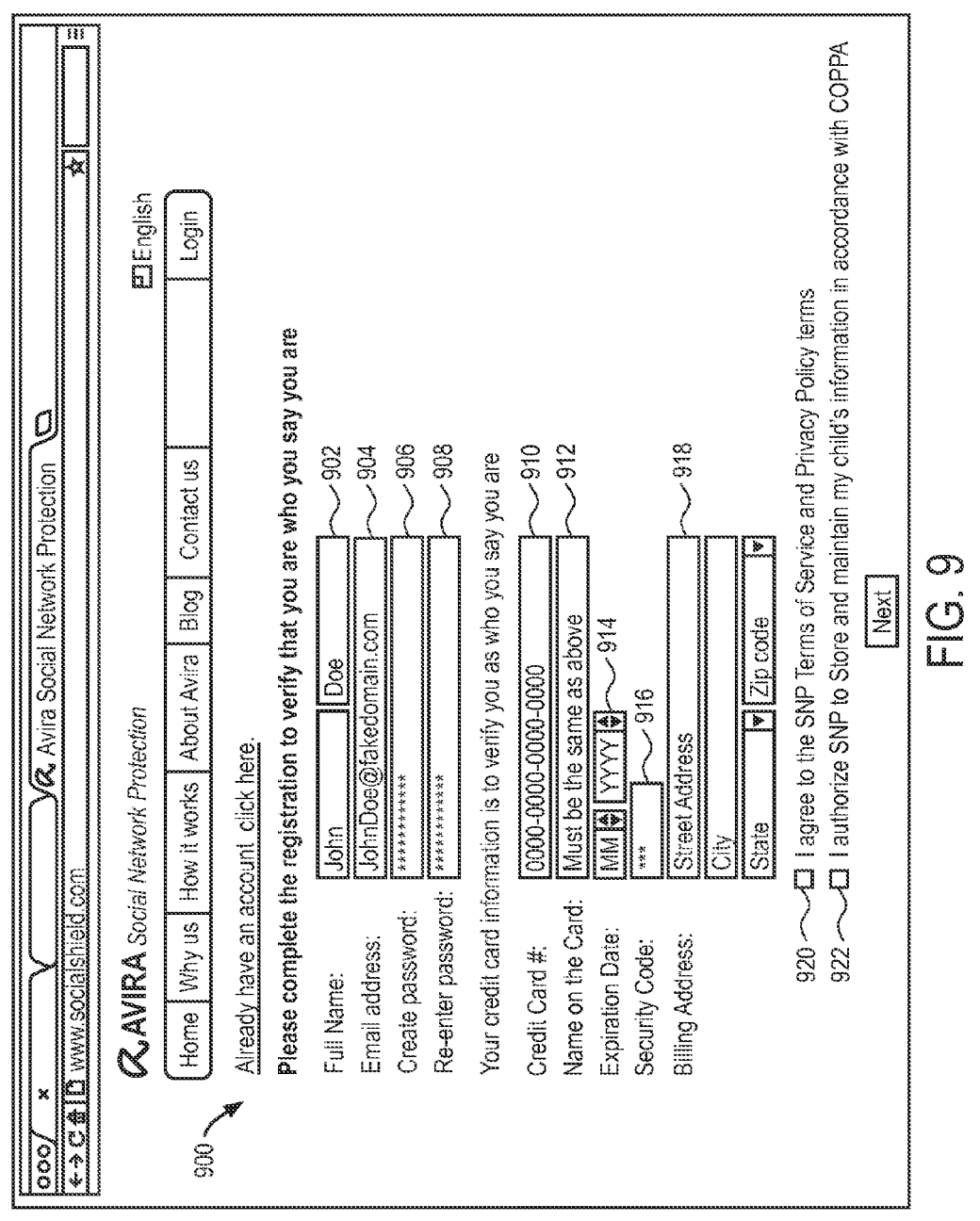

Next, in operation 320, the compliance service 106 asks the parent/guardian 110 to provide the service 106 with personal information as well as information about a credit card of the parent. FIG. 9 is an exemplary parent information webpage 900 that may be displayed to the parent 110 by the compliance service in operation 320 in which the parent can input his or her personal information and credit card information. As shown in FIG. 9, the page 900 may include input fields 902, 904 for inputting parent's 110 name and email address as well as fields 906, 908 for the parent to provide an account password that may be used by the parent to login to the compliance service 106. The page may also display input fields for providing the parent's credit card information including, for example, a credit card number 910, the name on the card 912, the expiration date on the card 914, the security code on the back of the card 916, and the billing address for the credit card account 918. The page 900 may also display user-selectable inputs 920, 922 (e.g., check boxes) that allow the parent 110 to authorize the compliance service to agree to terms of service and privacy policies as well as authorize the compliance service to store and monitor information about the child user 108, for example, in accordance with COPPA requirements and guidelines.

In operation 322, the compliance service uses the credit card information provided by the parent 110 in operation 320 to carry out a credit card transaction with a credit card provider in order to confirm the identity of the parent 110. In this transaction, the parent's credit card may be charged or a charge transaction followed by a credit transaction of equal amounts so that the actual amount charged to the parent's credit card is nominal or nothing. As an alternative to conducting a transaction to charge the credit card, compliance service 106 may generate a verification code and send that code by post to the credit card billing address provided by the parent in operation 320. When the parent receives the verification code in the mail, the parent may then transmit the verification code to compliance service 106 via the network in order to confirm the address of the parent 110.

If the parent 110 correctly answers the security question in operation 318 and the compliant service determines that a valid credit card transaction has been processed using the credit card information provided by the parent (see operations 320, 322), then a profile for parent may be created and stored in the COPPA database 210 containing information about the parent 110 and the child 108 associated with the parent in operation 324. The stored information 326 may include, for example, the personal information about the parent 110 and the child 108 (including the parent's the credit card information) collected in during the process described with reference to FIG. 3. As shown in FIG. 3 at this point 328 in the process the child's 108 information has been added to the COPPA Database 210 and the parent-child relationship between the parent 110 and the child 108 has been authenticated by the compliance service 106. Once an account for the parent has been created, the parent 110 may then subsequently login to the compliance system using login information stored with the compliance service (e.g., login username or email address and a corresponding password associated with the parent's account).

In decision 330, the compliance service queries the parent/guardian 110 (from either operations 307 or 324) to determine whether the parent 110 will grant the child user 108 permission to access the requested website/online service. As shown in FIG. 3, the parent 110 may notify the compliance service to either grant (YES path from decision 330), deny (NO path from decision 330) authorization to allow the child user 108 to access the designed website/online service 102 or in the case of a previously granted authorization, revoke the authorization (operation 332). After receiving the parent's 110 authorization response (e.g., grant, deny, or revoke) via the network 104, the compliance service may then notify the website/online service 102 in operation 334 that authorization for the child user's 108 access to the website has been granted, denied or revoked per the parent's command. The compliance service may also allow the parent 110 to send a command to or revoke a previously granted authorization (operation 332). If access is authorized, the website/online service 102 may then complete its registration process with the child user and create an account for the child. If access is denied, the website/online service 102 may then terminate its registration process with the child user and thereby not register the child. Finally, if access is revoked, the website/online service 102 may close and/or delete the child's account and block the child from gaining further access to the website. In such a situation, a record may be stored by the compliance service 106 and/or the website 102 that the parent has revoked authorization for the child.

Figure 10:
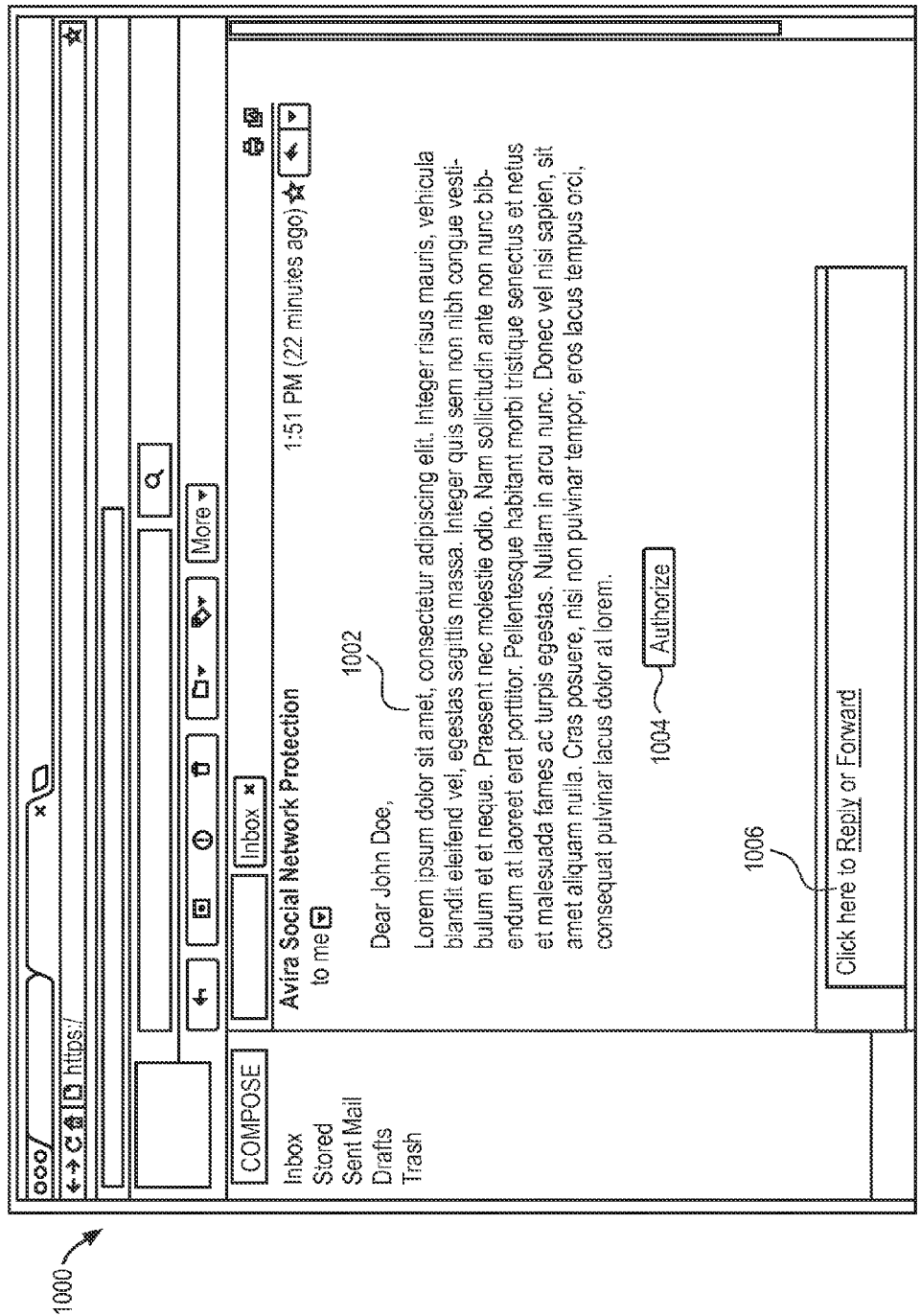
FIG. 10 is an exemplary call to action email that may be sent from the compliance service to a parent in accordance with one embodiment.

FIG. 10 is an exemplary call to action email 1000 that may be sent from the compliance service to a parent in operation 307 or in operation 316. The email 1000 sent to the parent/guardian 110 may include a message 1002 that identifies the child 108 and the website/online service 102 that the child seeks access to. The email may also include one or more selectable links 1004 (e.g., an authorize button and/or a deny button) that allows the receiving parent to reply to the request by sending the compliance service a response indicating whether the parent authorizes the child to access the requested website. Alternatively, as shown in FIG. 10, selection by the parent 110 of the selectable link 1004 may display the query webpage 800 of FIG. 8 in accordance with operation 318 if the email was sent accordance to operation 316. In a similar fashion, if the email 100 is sent in accordance with operation 307, selection of the selectable link 1004 may display a parental login page in which the parent 110 may login into the compliance service 106 by providing his or her email address (or username) and corresponding password. As yet another alternatively, the email may simply request that the parent/guardian 110 reply to the email simply through a reply email (such as, e.g., by selecting reply link 1006) and include a short message indicating that the parent grants authorization to the compliance service 106 to allow the child access to the website 102.

It should be understood that an authorized parent/guardian 110 may be have more than one child. As a result, the compliance service 106 may associate multiple child users with any given parent account in the COPPA database so that the same parent/guardian can authenticate the parent-child relationship and grant/deny/revoke access to websites for each associated child user.

In accordance with one embodiment, COPPA compliance service 106 may also create a login for all those children that have been authenticated by an authorized parent/guardian and have an email. This way, each registered child can then subsequently login to the compliance service in order to request their parent's for authorization to one or more additional third party sites.

Figure 4:
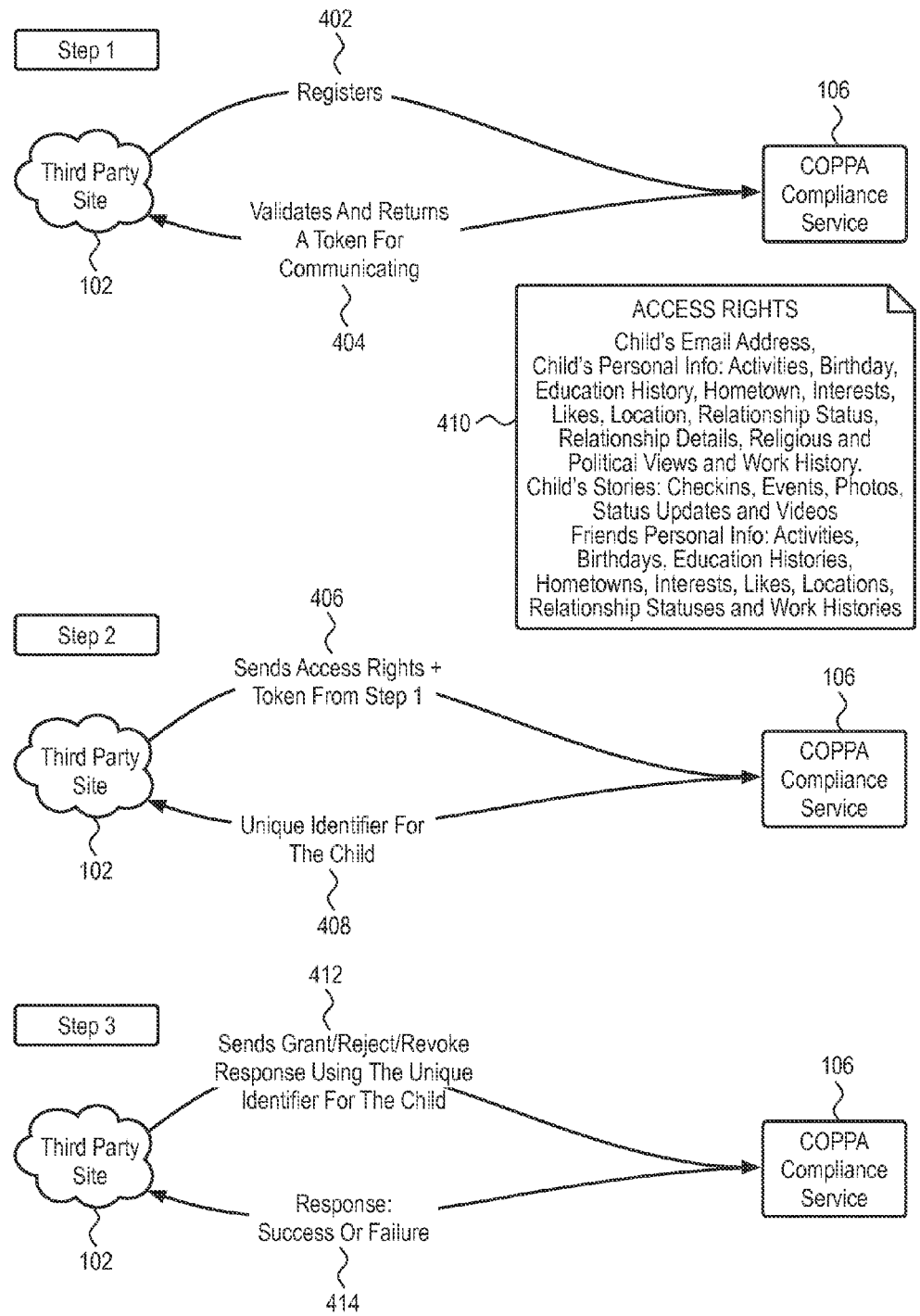
FIG. 4 is a process diagram of an exemplary procedure for establishing communications with the COPPA compliance service by a third-party site.

FIG. 4 is a process diagram of an exemplary procedure for establishing communications with the COPPA compliance service 106 by a third-party site 102. In accordance with one embodiment, the various communications shown in FIG. 4 between the third-party site 102 and the COPPA compliance service 106 may be carried out over the Internet 104. As depicted at the top of FIG. 4 ("Step 1"), the online service provider 102 first registers with the COPPA compliance service 106 (path 402). In response, the service 106 determines whether third party site 102 complies with the service's standards and/or requirements (e.g., whether the site 102 is reputable, whether the site 102 meets the service's security requirements for storing child's data, etc.) and if so, the service 106 validates the site 102 and returns a unique token ("API token") to the site 102 (path 404) for use in subsequent communications with the service 106.

Subsequently (with reference to "Step 2" on FIG. 4), when the now registered site 102 sends a request to the COPPA compliance service 106 (path 406), the service 106 uses the parameters of the request to generate and send a unique identifier for the child (referred to herein as a "UID") back to the site 102 (path 408). The request's parameters may include the API token previously received from the service 106 (in path 404) as well as access rights information 410 about the child associated with the request.

The access rights information 410 in the request may include information about the child that the online company intends to store on its site 102 including, for example, the child's email address, personal information about the child, other data associated with the child, and/or information about the child's friends. Exemplary personal information about the child may includes information about the child's activities, birthday, education history, hometown, interests, likes, dislikes, location, relationship status, relationship details, religious or political views, and/or work history. Exemplary other data about the child may include story data associate with the child such as check-in instances, events, photos, status updates, and/or videos. Exemplary friends' information associated with the child may include personal information about the friends including information about their activities, birthdays, education histories, hometowns, interests, likes, locations, relationship statuses, and/or work histories.

With continuing reference to FIG. 4 ("Step 3"), the COPPA compliance service 106 may use the UID to authorize, reject or revoke the third party site's access to store child's data (path 412). In one embodiment, the COPPA service 106 may also provide the first name, last name, email and date of birth info of the child as part of the authorization request. In response to the authorization/rejection/revocation command sent from the service 106, the site 102 may send a responsive message that indicates whether command was executed successfully or not by the site 102 (path 414).

Figure 5:
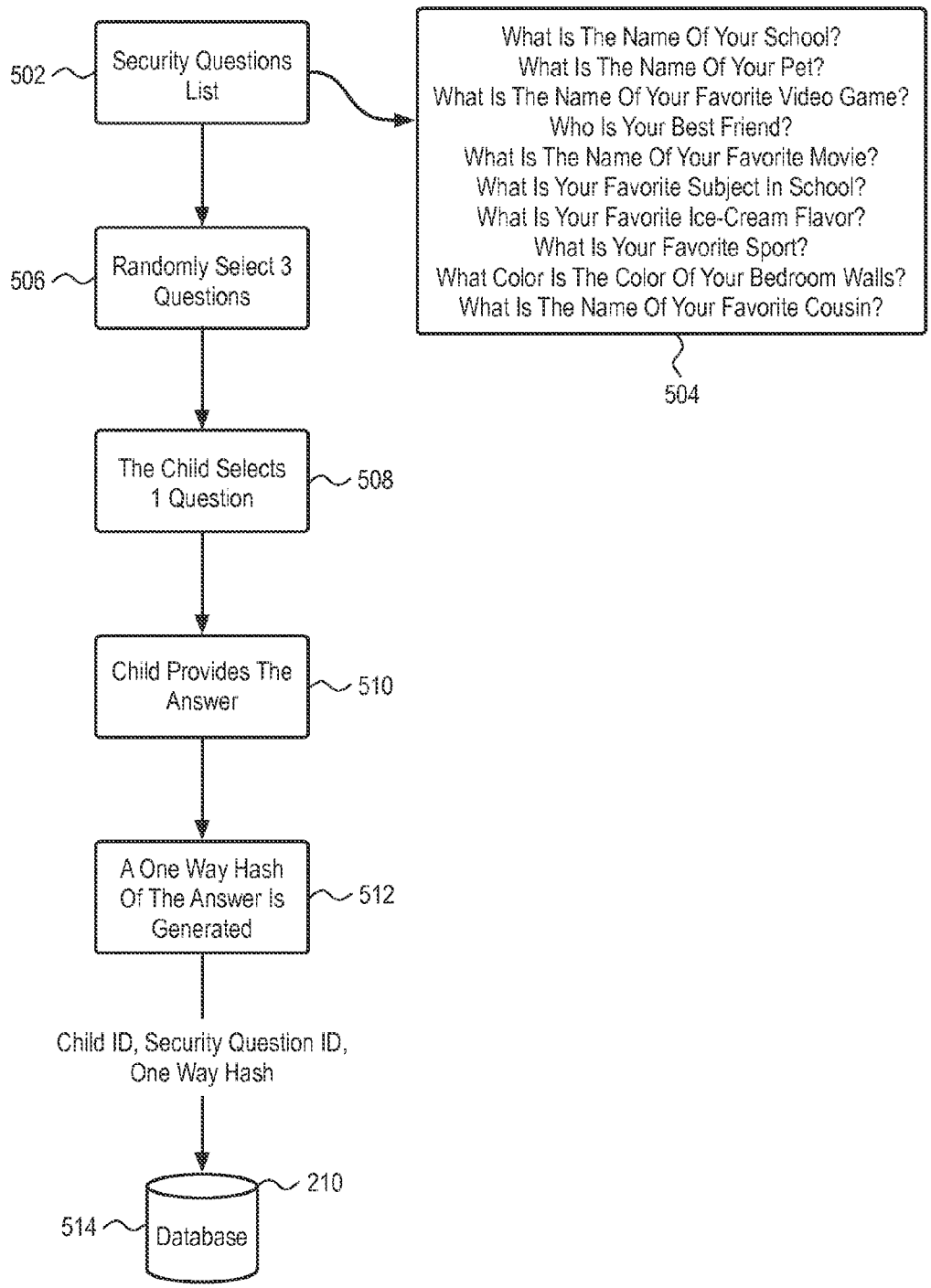
FIG. 5 is a flowchart of a security question procedure in accordance with one embodiment.

FIG. 5 is a flowchart of a security question procedure in accordance with one embodiment. In operation 502, the COPPA compliance service 106 accesses a set of security questions 504 that it maintains. In one embodiment, the COPPA compliance service 106 maintains the security questions from a security question table (or portion) of a database maintained by the COPPA compliance service 106. As shown in FIG. 5, the set of security questions 504 may contain a plurality of pre-generated questions that a typical child could be expected to answer such as for example: "What is the name of your school?", "What is the name of your pet?", "What is the name of your favorite video game?" In one embodiment, each question in the security table has an unique identifier (that may be referred to as the "security question ID") associated with it that can be used to identify the question. These unique security question IDs may simply be numerical or alphanumerical values that the compliance system 106 may use to refer back to the underlying security question. For example, the security question "What is the name of your school?" may be associated with a security question ID having a value of "1" while the question "What is the name of your pet?" by be associated with a security question ID value of "2." This way the compliance system may refer to these two questions simply by their associated security question IDs (i.e., 1 and 2) during the operations described herein.

In operation 506, the COPPA compliance service 106 randomly selects a predetermined number of security questions from the set 504 and sends the questions to the child's computer 108 via the network 104 for presentment to the child (e.g., by displaying the selected questions to the child via a monitor (or other suitable display) of the child's computer). As shown in operations 508, 510, the child then may select and answer one of the displayed questions. In response to the child providing an answer, a one way hash of the child's answer is then generated in operation 512. In one embodiment, the answer itself is sent from the child's computer to the COPPA compliance service 106 via the network 104 so that the COPPA compliance service 106 may generate the one-way hash of the answer. In another embodiment, the one-way hash of the child's answer may be generated at the child's computer and then transmitted to the COPPA compliance service 106 via the network 104.

One of ordinary skill in the art will understanding that a one-way hash function is a mathematical function that typically takes a variable-length input string and converts it into a fixed-length binary sequence. A one-way hash function is typically designed in such a way that it is hard to reverse the process, that is, to find a string that hashes to a given value (hence the name one-way.) A one-way hash functions may also be referred to as a message digest, fingerprint or compression function. One exemplary one-way hash function is referred in the art as MD5.

In operation 514, the one-way hash derived from the answer along with the security question ID of the question selected and answered by the child is stored in the database 210 of the COPPA compliance service 106 along with a unique identifier associated with the child (that may be referred to as the "child ID"). By storing the child ID, the security question ID and the one-way hash, no actual information about the child has to be stored. Instead, simply an anonymous set of three or more numbers are associated together. As previously described, an email may then be sent to the parent with a call to action for the parent to authenticate (see FIG. 3, operation 316). This call to action may contain all of the necessary child information (e.g., first name, last name, email, date of birth) that may be needed by a parent 110 in order to verify the parent's relationship with the child user 108. In accordance with one embodiment, the COPPA compliance service at this point does not need store any of the child's information because the parent/child relationship is not yet established. The only info persisted at this point is the unique identifier (UID) or child ID, the associated security question ID and the one way hash of the answer. As a result, one potential advantage of the various embodiments described herein is that the COPPA compliance service 106 itself may remain COPPA compliant because it does not store any of the child 108 information, until the parent 110 has authenticated the relationship with the child.

Figure 11:
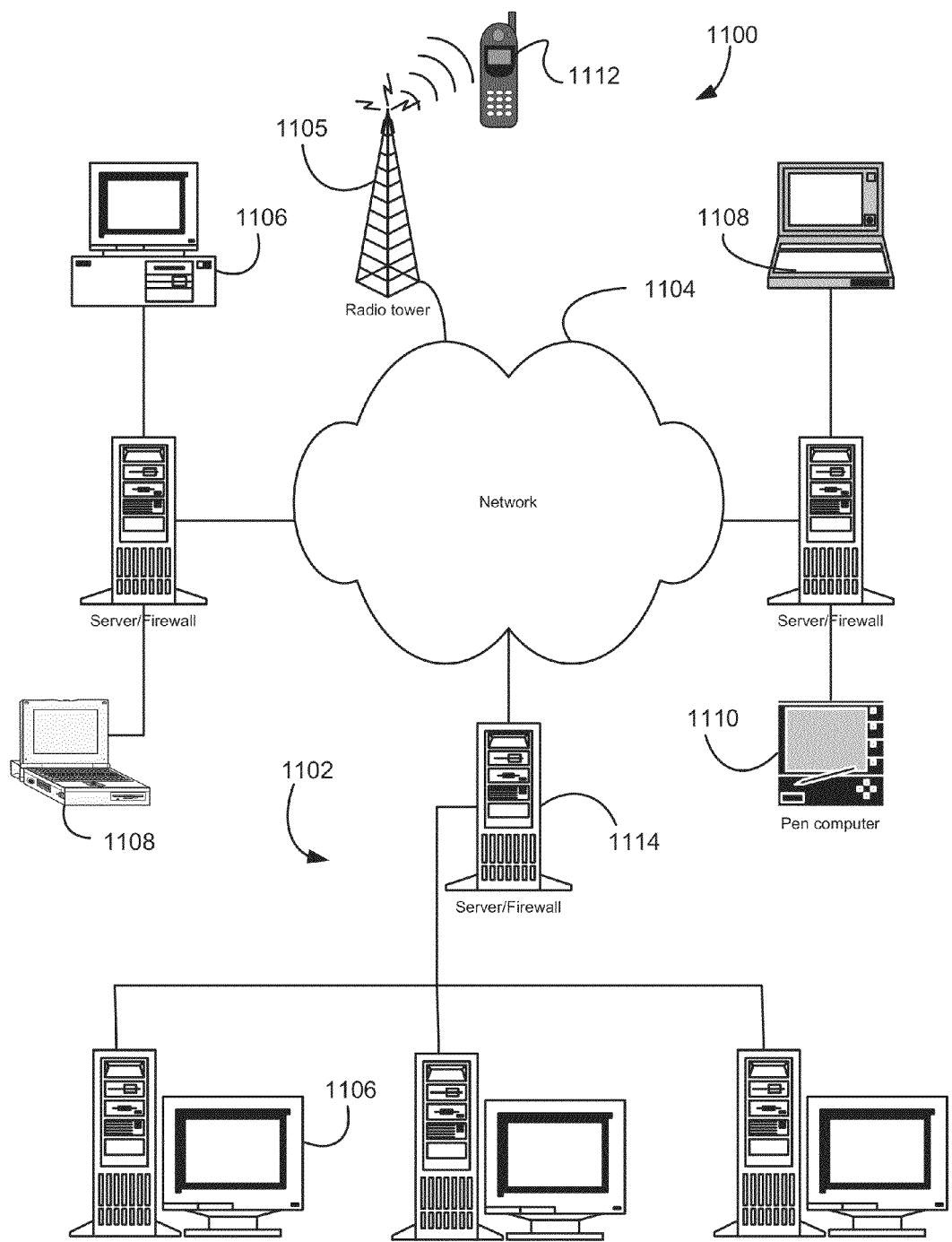
FIG. 11 is a schematic diagram of an illustrative network system in accordance with an exemplary embodiment.

FIG. 11 illustrates an exemplary network system 1100 with a plurality of components 1102 that may be used when implementing various embodiments described herein. As shown, such components include a network 1104 which take any form including, but not limited to a local area network, a wide area network such as the Internet, and a wireless network 1105. Coupled to the network 1104 is a plurality of computers which may take the form of desktop computers 1106, lap-top computers 1108, hand-held computers 1110 (including wireless devices 1112 such as wireless PDA's or mobile phones/smart phones), or any other type of computing hardware/software. As an option, the various computers may be connected to the network 1104 by way of a server 1114 which may be equipped with a firewall for security purposes. It should be noted that any other type of hardware or software may be included in the system and be considered a component thereof.

Figure 12:
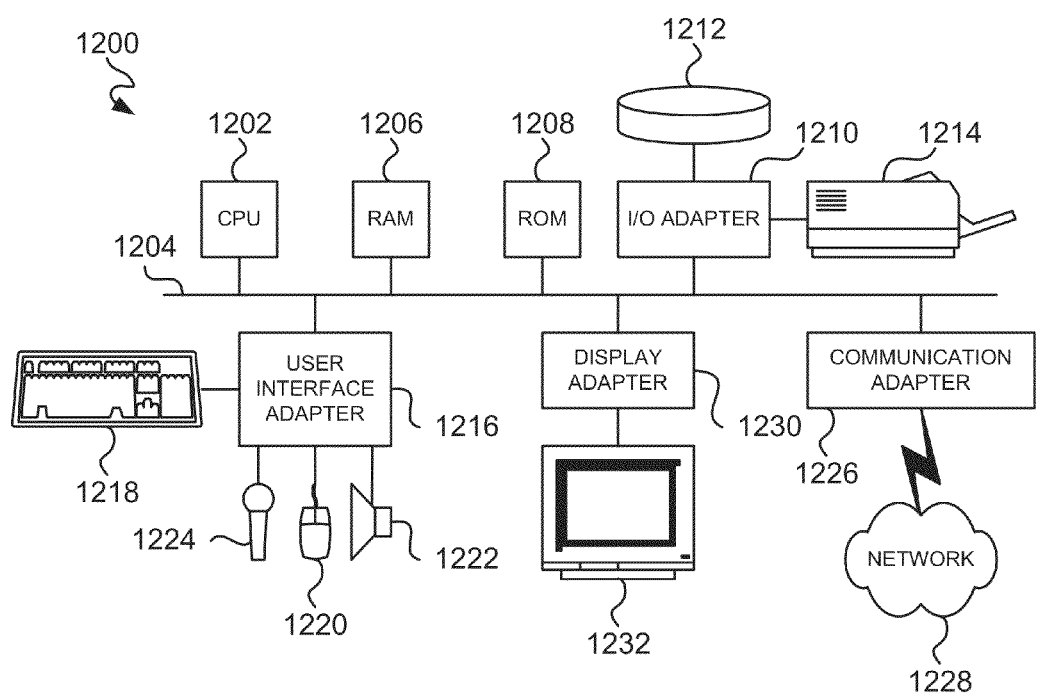
FIG. 12 is a schematic diagram of a representative hardware environment in accordance with one embodiment.

A representative hardware environment associated with the various components of FIG. 11 is depicted in FIG. 12. In the present description, the various sub-components of each of the components may also be considered components of the system. For example, particular software modules executed on any component of the system may also be considered components of the system. In particular, FIG. 12 illustrates an exemplary hardware configuration of a computer 1200 having a central processing unit 1202, such as a microprocessor, and a number of other units interconnected via a system bus 1204. The illustrative computer 1200 shown in FIG. 12 includes a Random Access Memory (RAM) 1206, Read Only Memory (ROM) 1208, an I/O adapter 1210 for connecting peripheral devices such as, for example, disk storage units 1212 and printers 1214 to the bus 1204, a user interface adapter 1216 for connecting various user interface devices such as, for example, a keyboard 1218, a mouse 1220, a speaker 1222, a microphone 1224, and/or other user interface devices such as a touch screen or a digital camera to the bus 1204, a communication adapter 1226 for connecting the computer 1200 to a communication network 1228 (e.g., a data processing network) and a display adapter 1230 for connecting the bus 1204 to a display device 1232. The computer may utilize an operating system such as, for example, a Microsoft Windows operating system (O/S), an Apple O/S, a Linux O/S and/or a UNIX O/S. Those of ordinary skill in the art will appreciate that embodiments may also be implemented on platforms and operating systems other than those mentioned. One of ordinary skilled in the art will also be able to combine software with appropriate general purpose or special purpose computer hardware to create a computer system or computer sub-system for implementing various embodiments described herein. It should be understood the use of the term logic may be defined as hardware and/or software components capable of performing/executing sequence(s) of functions. Thus, logic may comprise computer hardware, circuitry (or circuit elements) and/or software or any combination thereof.

Embodiments of the present invention may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., The article of manufacture containing the computer code may be made and/or used by executing the code directly from one medium, by copying the code from one medium to another medium, or by transmitting the code over a network.

Various systems, methods, and computer program products on a computer readable storage medium for causing a computer to perform a method may be implemented in accordance with the various embodiments described herein. For example, a server may be provided that has a component coupled to a network to permit the receiving, via the network, of one or more messages containing information describing one or more aspects of a malware detected on a remote computer by an antivirus program.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method, comprising:
    receiving from a site coupled to a network a request sent via the network to authorize a user seeking access to the site, the request being received at a service coupled to the network and remote from the site and the user;
    determining whether the user has previously registered with the service;
    if the user is determined to have been previously registered with the service, the service identifying an authorizing agent associated with the user from a database coupled to the service; and sending a message to the identified authorizing agent that requests that the authorizing agent authorize the user to access the site;
    if the user is determined not to have been previously registered with the service, the service checking the database to determine whether at least one authorizing agent is associated with the user in the database; displaying, via the network, to the user a list of one or more authorizing agents that are determined to be associated with the user; permitting the user to select one of the authorizing agents from the list; and sending a message to the selected authorizing agent that requests that the authorizing agent authorize the user to access the site;
    if the user does not select any authorizing agent from the list, the service querying the user, via the network for a name of the user, address information associated with an authorizing agent that is authorized to authorize the user to access the site, and for an answer to a security question;
    querying the authorizing agent to confirm that the user is associated with the authorizing agent and to provide an answer to the security question; obtaining credit card information of the authorizing agent; determining whether the answer provided by the authorizing agent matches the answer provided by the user; and determining whether the credit card information corresponds to at least a portion of the address information provided by the user;

receiving an authorizing message from the authorizing agent indicating whether the authorizing agent authorizes the user to access the site;

storing a record in the database indicating whether the authorizing agent authorized the user to access the site; and sending the site, via the network, a message indicating whether the authorizing agent authorized the user to access the site.

2. The method of claim 1, wherein the authorizing agent is a parent or legal guardian of the user.

3. The method of claim 1, wherein the user is a child less than thirteen-years old.

4. The method of claim 1, wherein the security question is selected from a set of predetermined security questions obtaining from a plurality of security questions stored in the database, wherein each security question has a unique identifier associated therewith in the database.

5. The method of claim 1, further comprising assigning a unique identifier to the user; assigning a unique identifier to the security question; generating a one-way hash from the unique identifier of the user, the unique identifier of the security question and the answer provided by the user; generating a one-way hash from the unique identifier of the user, the unique identifier of the security question, and the answer provided by the authorizing agent; comparing the generated one-way hashes to determine they match; and if the one-way hashes are determined to match, authenticating the relationship between the user and the authorizing agent.

6. The method of claim 1, further comprising receiving a message from the authorizing agent revoking the user's authorization to access to the site notifying the site that the user's access has been revoked.

7. The method of claim 1, wherein information about the user is not stored by the service until a relationship has been confirmed between the authorizing agent and the user.

8. The method of claim 7, wherein the relationship is a parent-child relationship.

9. The method of claim 1, further comprising receiving a request to register the site with the service; determining whether the site meets predefined criteria; if the site meets the predefined criteria, creating a record for the site in the database; and sending a token to the site for use in subsequent communications with the service.

10. The method of claim 1, further comprising receiving a reply from the site confirming that that site has performed an action corresponding to the indication as to whether the authorizing agent has authorized the user to access the site.

11. A computer program product embodied on a tangible, non-transitory computer readable medium for causing a computer to perform a method, the method comprising:

receiving from a site coupled to a network a request sent via the network to authorize a user seeking access to the site, the request being received at a service coupled to the network and remote from the site;

determining whether the user has previously registered with the service;

if the user is determined to have been previously registered with the service, identifying an authorizing agent associated with the user from a database coupled to the service; and sending a message to the identified authorizing agent that requests that the authorizing agent authorize the user to access the site;

if the user is determined not to have been previously registered with the service, checking the database to determine whether at least one authorizing agent is associated with the user in the database; displaying, via the network, to the user a list of one or more authorizing agents that are determined to be associated with the user; permitting the user to select one of the authorizing agents from the list; and sending a message to the selected authorizing agent that requests that the authorizing agent authorize the user to access the site;

if the user does not select any authorizing agent from the list, querying the user, via the network for a name of the user, address information associated with an authorizing agent that is authorized to authorize the user to access the site, and for an answer to a security question;

querying the authorizing agent to confirm that the user is associated with the authorizing agent and to provide an answer to the security question; obtaining credit card information of the authorizing agent; determining whether the answer provided by the authorizing agent matches the answer provided by the user; and determining whether the credit card information corresponds to at least a portion of the address information provided by the user;

receiving an authorizing message from the authorizing agent indicating whether the authorizing agent authorizes the user to access the site;

storing a record in the database indicating whether the authorizing agent authorized the user to access the site; and sending the site, via the network, a message indicating whether authorizing agent authorized the user to access the site.

12. A system, comprising:

a service coupled to the network;

the service having an interface for receiving from a site coupled to a network a request sent via the network to authorize a user seeking access to the site, wherein the service is remote from the site and the user;

the service having a database, wherein the service querying the database to determine whether the user has previously registered with the service;

if the user is determined to have been previously registered with the service, the service having logic for identifying an authorizing agent associated with the user from a database coupled to the service; and sending a message to the identified authorizing agent that requests that the authorizing agent authorize the user to access the site;

if the user is determined not to have been previously registered with the service, the service having logic for checking the database to determine whether at least one authorizing agent is associated with the user in the database; displaying, via the network, to the user a list of one or more authorizing agents that are determined to be associated with the user; permitting the user to select one of the authorizing agents from the list; and sending a message to the selected authorizing agent that requests that the authorizing agent authorize the user to access the site;

if the user does not select any authorizing agent from the list, the service having logic for querying the user, via the network for a name of the user, address information associated with an authorizing agent that is authorized to authorize the user to access the site, and for an answer to a security question;

the service having logic for querying the authorizing agent to confirm that the user is associated with the authorizing agent and to provide an answer to the security question; obtaining credit card information of the authorizing agent; determining whether the answer provided by the authorizing agent matches the answer provided by the user; and determining whether the credit card information corresponds to at least a portion of the address information provided by the user;

the interface of the service being adapted to receive an authorizing message from the authorizing agent indicating whether the authorizing agent authorizes the user to access the site;

the service having logic for storing a record in the database indicating whether the authorizing agent authorized the user to access the site; and the service having logic for sending the site, via the network, a message indicating whether the authorizing agent authorized the user to access the site.

13. The system of claim 12, wherein the authorizing agent is a parent or legal guardian of the user.

14. The system of claim 12, wherein the user is a child less than thirteen-years old.

15. The system of claim 12, wherein the security question is selected from a set of predetermined security questions obtaining from a plurality of security questions stored in the database, wherein each security question has a unique identifier associated therewith in the database.

16. The system of claim 12, wherein the service has logic for assigning a unique identifier to the user; assigning a unique identifier to the security question; generating a one-way hash from the unique identifier of the user, the unique identifier of the security question and the answer provided by the user; generating a one-way hash from the unique identifier of the user, the unique identifier of the security question, and the answer provided by the authorizing agent; the service having logic for comparing the generated one-way hashes to determine they match; and if the one-way hashes are determined to match, the service having logic authenticating the relationship between the user and the authorizing agent.

17. The system of claim 12, further comprising the service having an interface for receiving a message from the authorizing agent revoking the user's authorization to access to the site; and logic for notifying the site that the user's access has been revoked.

18. The system of claim 12, wherein information about the user is not stored by the service until a relationship has been confirmed between the authorizing agent and the user.

19. The system of claim 18, wherein the relationship is a parent-child relationship.

20. The system of claim 12, further comprising the service having an interface adapted for receiving a request to register the site with the service; determining whether the site meets predefined criteria; if the site meets the predefined criteria, creating a record for the site in the database; and sending a token to the site for use in subsequent communications with the service.

* * * * *